(12) United States Patent
Runco et al.

(10) Patent No.: US 7,654,678 B1
(45) Date of Patent: Feb. 2, 2010

(54) CINEWIDE WITH AUTOSCOPE

(75) Inventors: Virgil Sam Runco, Union City, CA (US); Mark Taylor Dixon, Hayward, CA (US); George Edward Gurr, Mariposa, CA (US)

(73) Assignee: Runco International, LLC, Beaverton, OR (US)

( * ) Notice: Subject to any disclaimer, the term of this patent is extended or adjusted under 35 U.S.C. 154(b) by 184 days.

(21) Appl. No.: 11/307,736

(22) Filed: Feb. 19, 2006

(51) Int. Cl.
*G03B 21/14* (2006.01)
*G03B 3/00* (2006.01)
*G02B 13/08* (2006.01)

(52) U.S. Cl. ..................... 353/101; 359/668

(58) Field of Classification Search ............... 353/101, 353/100; 348/771, 734; 359/670, 668, 207, 359/821, 822
See application file for complete search history.

(56) References Cited

U.S. PATENT DOCUMENTS

| | | | |
|---|---|---|---|
| 3,992,092 A | 11/1976 | Place | 355/41 |
| 4,283,766 A | 8/1981 | Snyder | 382/293 |
| 4,411,489 A | 10/1983 | McGrew | 359/9 |
| 4,745,469 A | 5/1988 | Waldecker | 348/94 |
| 4,899,218 A | 2/1990 | Waldecker | 348/94 |
| 5,793,415 A * | 8/1998 | Gregory et al. | 348/14.1 |
| 5,806,950 A * | 9/1998 | Gale et al. | 353/78 |
| 6,317,171 B1 * | 11/2001 | Dewald | 348/756 |
| 6,353,468 B1 | 3/2002 | Howard | 352/100 |
| 6,587,159 B1 | 7/2003 | Dewald | 348/744 |
| 6,755,540 B1 | 6/2004 | Runco | 353/101 |
| 6,770,866 B2 | 8/2004 | Retschke | 250/235 |
| 6,984,044 B2 | 1/2006 | Kurioka | 353/99 |
| 2004/0141157 A1 * | 7/2004 | Ramachandran et al. | 353/70 |

\* cited by examiner

*Primary Examiner*—William C Dowling
*Assistant Examiner*—Ryan Howard
(74) *Attorney, Agent, or Firm*—Stoel Rives LLP

(57) ABSTRACT

A video display system which combines image processing and an anamorphic lens which displays television, HDTV wide-screen format images, and Cinemascope theatre video in a constant vertical height automatically with no resolution lost to black stripes on the top and bottom of the screen that contain no picture information.

25 Claims, 4 Drawing Sheets

CINEWIDE WITH AUTOSCOPE

FIELD OF INVENTION

This invention relates to video imaging technology, particularly high-end home cinema video display systems, which allows switching to a viewing mode which provides theatre quality wide-screen viewing for movies formatted in Cinemascope 2.35:1 with the single press of a button and without any loss of the original image quality.

DESCRIPTION OF PRIOR ART

There have been developments in video systems that provide the ability for installing in the home wide-screen video systems which can approach viewing quality only previously available in the movie theatre. These home "theatre" video systems utilize DIGITAL LIGHT PROCESSING® ("DLP®") projectors and can display television, High-Definition Television (HDTV) widescreen format, and theatre video. The theatre quality video can originate in Cinemascope 2.35:1 format.

Cinemascope is a simple and inexpensive process used in filming movies for the theatre which simulates three-dimension to the extent that objects and actors appear to be part of the audience. This creates a panoramic effect where actors seem to walk into the audience and ships appear to sail into the first rows of the movie theatre. Cinemascope filming has been in existence for the past 50 years and nearly 80% of films are made using this technique. The viewing of Cinemascope recorded films had required special attachments to film projectors that were only found in movie theatres.

However the desire to view movies in the home with a theatre like experience has resulted in the increased popularity of home-theatre systems where the media is either a video tape or DVD and not film. For home theatre systems the film projector has been replaced by the DLP projector.

The DLP projectors do not contain CRT tubes but instead use a spatial light modulator or digital light processor, such as a semiconductor device called a digital micromirror device ("DMD"), to generate images. The DMD allows DLP projectors to generate large scale images in higher quality than CRT type projectors.

However up to now the DLP projectors, when used to view Cinemascope theatre format images of 2.35:1 resolution, have not been without drawbacks. The major drawback was that when reproducing the theatre format 2.35:1 wide screen images there has been a black strip on the upper and lower portions of the viewing image.

The black strip located on the upper and lower portions of the viewing screen resulted from the image being compressed to accommodate the broader width of the theatre format 2.35:1 widescreen image. When doing the compressions a loss of pixels results and image resolution is reduced.

SUMMARY

The present invention overcomes the previous deficiencies of home-theatre systems and produces an improved experience in the home displaying images in constant height for any aspect ratio. Particularly for the 2.35:1 Cinemascope theatre format, the invention eliminates the black bars on the top and bottom of the screen. The invention utilizes the total pixel capability of the DLP projector's DMD even when displaying theatre format 2.35:1 format video. A motorized anamorphic lens and the DLP projector resolution is automatically controlled by the video controller electronics to generate an image of increased brightness and resolution while maintaining constant height for all viewing sources including television, HDTV wide-screen and Cinemascope movie theatre format video images.

When viewing television or HDTV wide-screen video, the system automatically moves the anamorphic optics out of the light path and sets the projector DMD to the proper pixel resolution. For theatre Cinemascope 2.35:1 aspect ratio viewing, the anamorphic lens is moved automatically into position in the light path and the projector DMD is set to its highest resolution.

Selection of the proper DMD resolution and positioning of the anamorphic optics is accomplished with the single selection of the desired video source on the system remote control. The user can easily change between viewing sources and viewing modes without having to leave their seat and without having to make any manual adjustments.

DETAILED DESCRIPTION OF THE INVENTION

Figure 1:
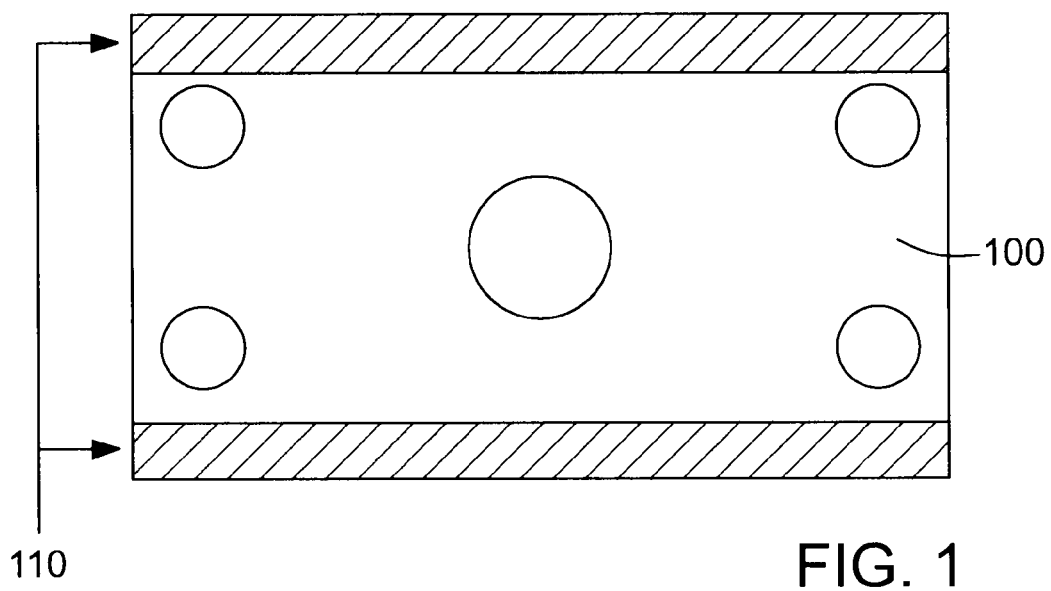
FIG. 1 shows the prior art result when displaying 2.35:1 Cinemascope images with the resulting black stripes on the top and bottom of the screen resulting in lost resolution

The new and improved video system described herein avoids the pitfalls of the predecessor systems and does not reduce resolution when displaying Cinemascope theatre 2.35:1 formatted video images. Additionally, the new and improved video system eliminates the annoying black stripes which appear horizontally on the top and bottom of the screen maintaining a constant vertical height image. FIG. 1 illustrates how Cinemascope 2.35:1 images are displayed using the prior art. In FIG. 1 the lost resolution in the image area 100 from the wider format image results in a black stripe at the top and bottom of the screen (illustrated as hatch stripes 110). The black stripes are created because the DLP projector is maintaining proper image geometry.

Figure 2:
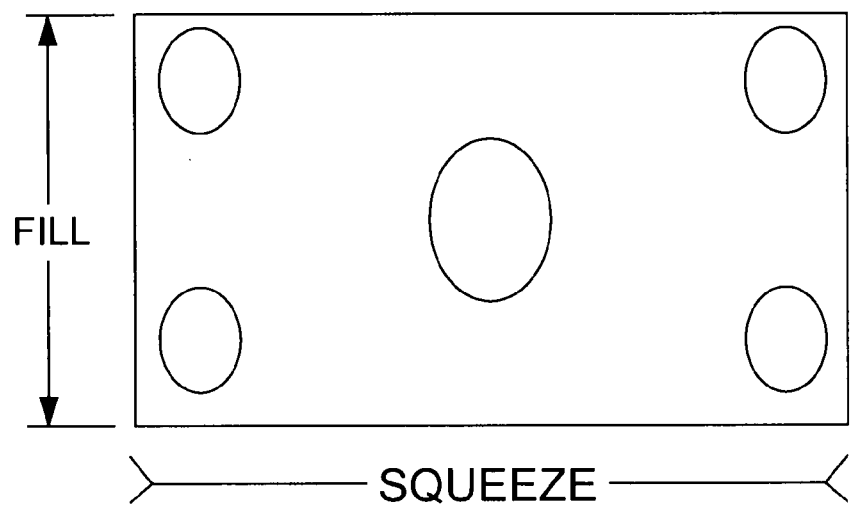
FIG. 2 illustrates how the video controller and DLP projector take the 2.35:1 Cinemascope image and process it by squeezing it into a 16:9 or 4:3 image area.
Figure 3:
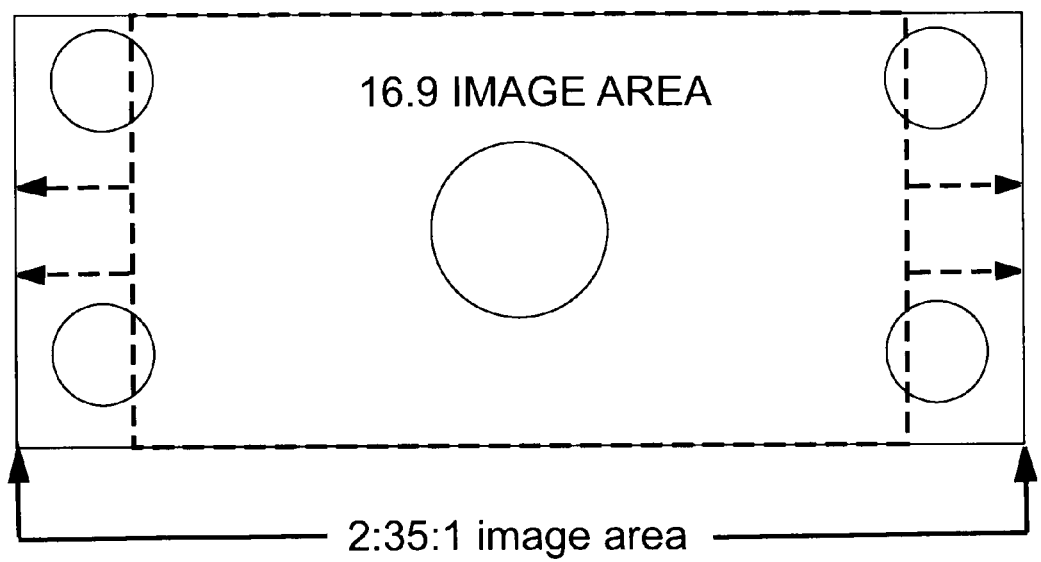
FIG. 3 shows how the anamorphic lens "stretches" the "squeezed" image back to its normal geometry utilizing the full width of the screen without a loss of vertical height.
Figure 4:
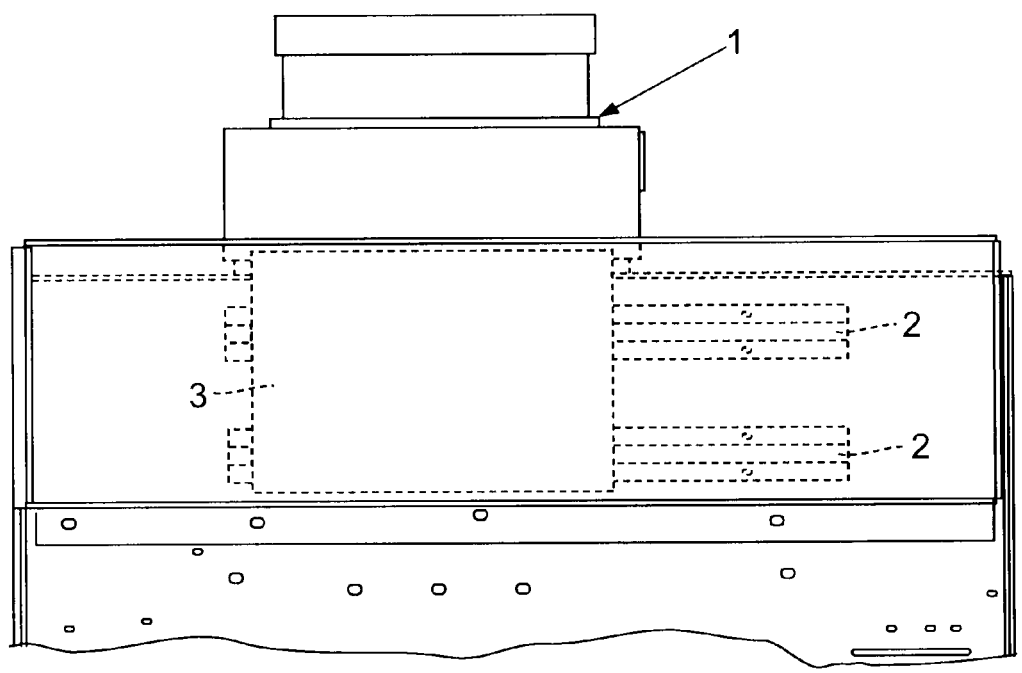
FIG. 4 shows the Autoscope assembly.

The new and improved video system enhances the performance of an equipped video projector by processing the incoming Cinemascope theatre video signal by "squeezing it" so that the full pixel array is utilized and all the original image purity is maintained. FIG. 2 depicts how the image is "squeezed" into either 16:9 or 4:3 format. The image is then "stretched" through the addition of an anamorphic lens that is located external to the video projector which restores the correct image geometry providing a full resolution while utilizing 100% of the DMD pixels. FIG. 3 depicts how the image is expanded by the anamorphic lens to its original and proper geometry. In comparing FIGS. 2 and 3, it can be seen that in FIG. 3 the image simply gets wider while full height is maintained, and the annoying black stripes at the top and bottom of the screen are removed.

Figure 5:
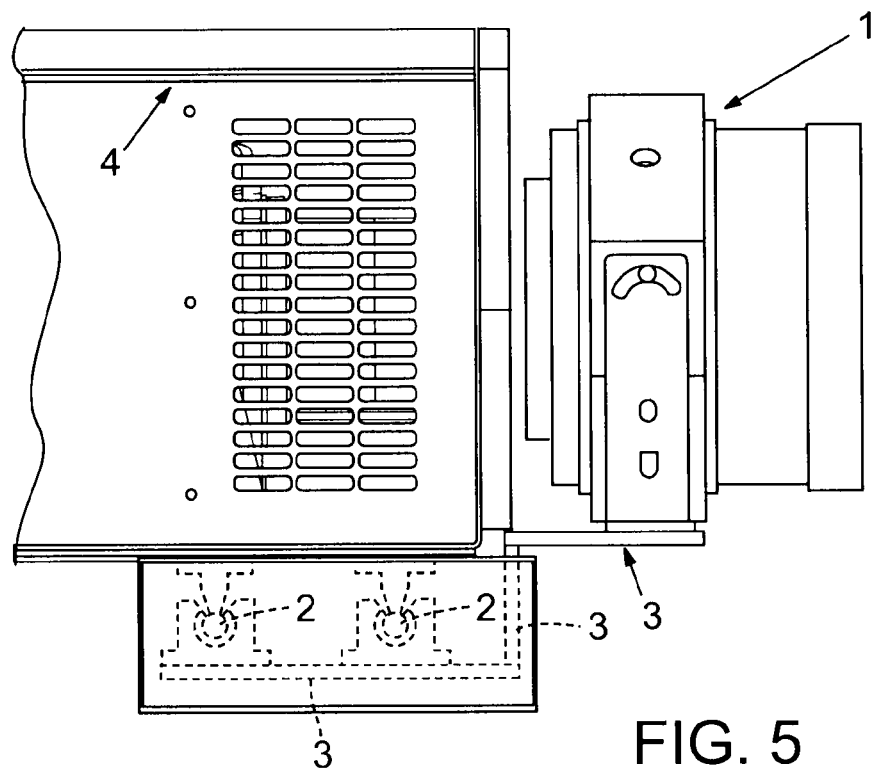
FIG. 5 shows a side view of the DLP projector with the Autoscope assembly attached.
Figure 6:
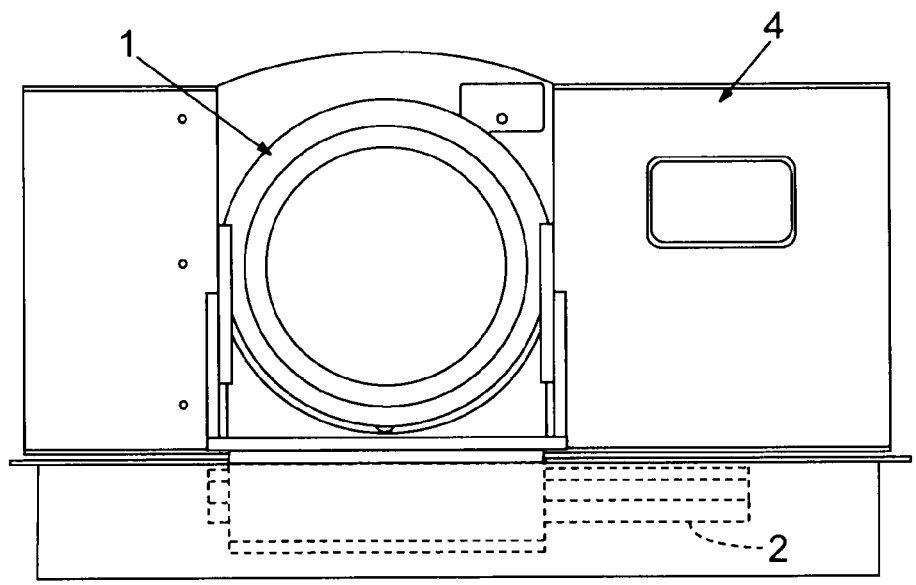
FIG. 6 shows a front view of the DLP projector with the Autoscope in the Cinemascope position for displaying 2.35:1 images.
Figure 7:
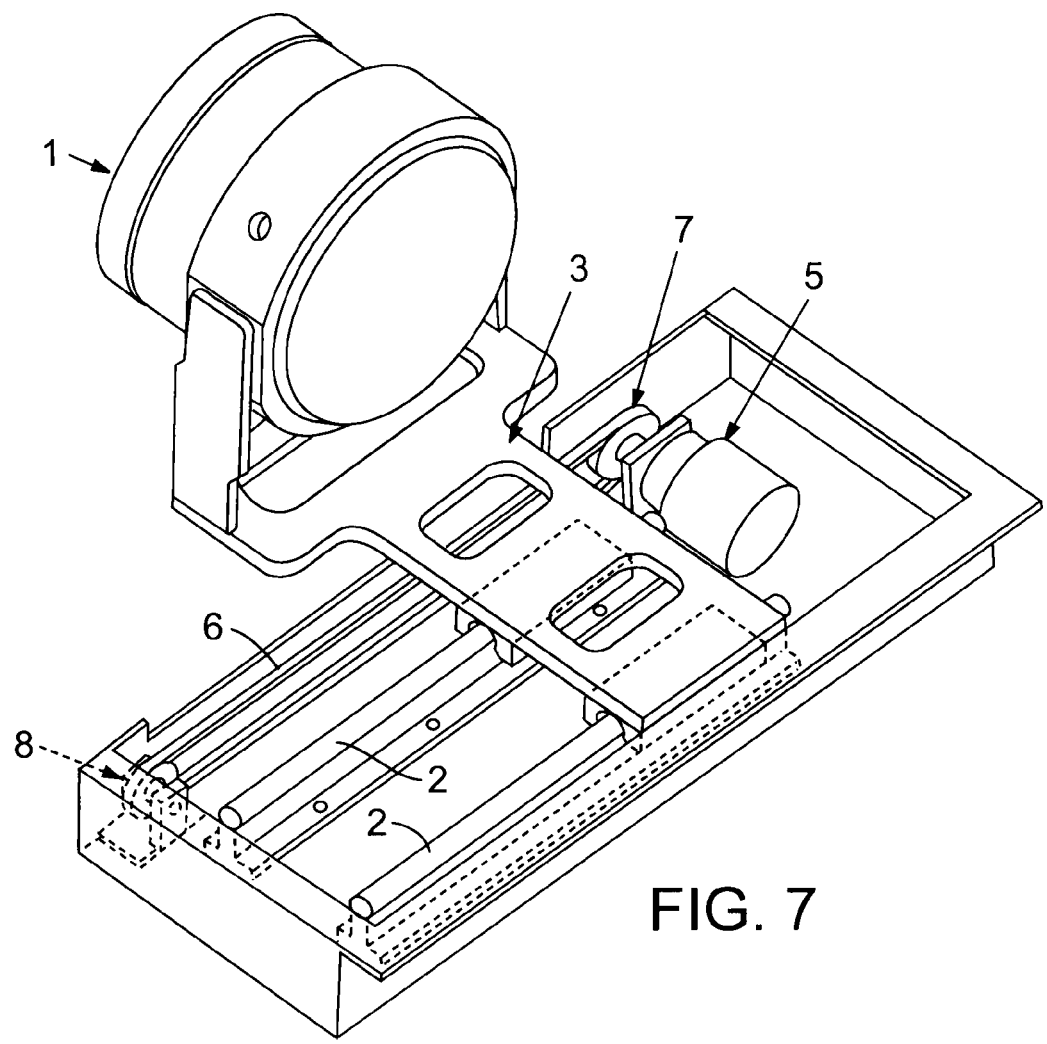
FIG. 7 shows an internal view of the Autoscope assembly.

Through the use of a DLP projector, remote control, video controller electronics, software and a motorized anamorphic lens, the new and improved video system is able to use the full pixel capabilities of the video projector, thereby producing enhanced resolution and elimination of the black stripes at the top and bottom of the screen. The invention can be adapted to any DLP projector which is capable of displaying 4:3 and 16:9 images. FIGS. 5 and 6 show the invention adapted to a RUNCO® VX series DLP projector.

The new and improved video system includes a suitable DLP projector, such as the RUNCO models identified above, a remote control from which a user can control the system, a video controller which works in conjunction with the DLP projector to display the proper image resolution and control the motorized anamorphic lens. The video controller may be integral to the DLP projector as is the case in the RUNCO VX series or external to the DLP projector. The video controller electronics and software select the proper processing format in response to the signal received from the remote control and appropriately configure the DLP projector to reproduce the image with correct resolution and image clarity.

The remote control of the new and improved video system has a selection button for each desired video source, either television, wide-screen or Cinemascope theatre mode. When the system is configured the video controller is programmed to recognize each selection button and the appropriate projector settings for that source are stored. When the user selects one of the source buttons, the remote control signals the video controller with the source selection and the video controller automatically configures the DLP projector for proper image reproduction.

Not all video viewing is in theatre Cinemascope format, thus the new and improved video system can not only automatically select the proper video processing but also automatically moves the anamorphic lens into the light path or out of the way in accordance with the image type being viewed. The user simply selects the Cinemascope theatre 2.35:1 mode on their remote control and the video projector and anamorphic lens are placed in the projector light path. When the mode selected is television 4:3 format or HDTV 16:9 format, the projector resolution is automatically adjusted to 4:3 or 16:9 resolution respectively and the anamorphic lens moves out of the light path.

The video controller also adjusts the DLP projector resolution to 4:3 for television; or 16:9 for HDTV wide-screen or theatre Cinemascope format images. When the theatre source is selected the Cinemascope 2.35:1 image is "squeezed" into the 16:9 format within the projector and then passes thru the anamorphic lens which "stretches" the image back to the proper shape on the screen.

When the video controller receives a signal from the remote control indicating that video source selected, besides automatically adjusting the video projector resolution, it signals the anamorphic optics to move either in or out of position so that constant vertical height is maintained and a maximum pixel image results. A motorized control moves the anamorphic optics out of the light path for the television and wide-screen inputs. When theatre source is selected the video controller signals the anamorphic optics to move into the light path. Once the anamorphic optics move into the light path, the image is stretched back to 2.35:1 format from 16:9 or 4:3 with the correct geometry restored. As a result of the combination of the DLP projector "squeezing" the image and the subsequent "stretching" of the image by the anamorphic optics, a resulting full screen 2.35:1 image is projected without any black stripes at the top or the bottom of the screen.

FIGS. 4 through 7 depict one embodiment of the motorized anamorphic optics adapted to the aforementioned RUNCO projector (4). In this embodiment the anamorphic optics (1) is attached to and carried on a carriage assembly (3). The carriage assembly moves along two rodslide rails (2). The rodslide rails (2) are mounted perpendicular to the light path and are of sufficient length to allow the carriage to move the anamorphic lens into the light path in one position and completely out of the light path when in a second position.

The anamorphic optics is mounted to the carriage so that it is parallel to the projector lens when directly in the light path. When the anamorphic optics are in the light path, the optics are located concentric to the internal projector lens. FIG. 6 shows the anamorphic lens in position in the light path for displaying of Cinemascope 2.35:1 images. The anamorphic optics are concentric and located between the projector lens and the viewing screen so that the light path is "projected" through the anamorphic optics before reaching the viewing screen. FIGS. 5 and 6 show the relationship of the anamorphic lens (1) and the DLP projector (4).

The movement of the carriage (3) which carries the anamorphic optics is controlled by a belt-driven precision AC motor (5) such as a T-geared synchronous series motor. The motor moves the carriage (3) in a two-way direction in response to a communications signal from the video controller. As stated earlier the video controller may be integral to the DLP Projector (4) as is the case in the embodiment shown. The communications signal is 12 V trigger activation which causes the motor (5) to move the carriage to a position which places the anamorphic optics directly in the light path.

In alternate embodiments, the anamorphic optics can be motorized such that rather than moving in a travel motion which is horizontal and perpendicular to the video projector lens, it instead moves in a vertical motion. In this alternate embodiment, the anamorphic optics can be raised vertically above the light path when moved out of position, or likewise lowered below the light path.

In yet another embodiment, the anamorphic optics can be tilted out of the light path so that it rotates 90 degrees down or up from its position in the light path. However regardless of the method used to move the anamorphic optics in and out of the light path, when the anamorphic optics is in position in the light path, it is located concentric to the video projector lens and positioned between the projector lens and the viewing screen.

Likewise in one embodiment shown, where the anamorphic optics is mounted to a carriage (3), the carriage movement is controlled by a motor (5) and a belt (6). The motor causes the belt to move. The belt (6) is attached to the carriage (3) and extends the length of the rodslide rails (2). The motor, which is stationary, has a gear (7) on its shaft to engage the belt at one end and the opposite end of the belt is looped around a second gear (8) which is fixed mounted at the opposite end of the rodslide rail. Thus as the motor shaft rotates the belt moves in the direction of the motor shaft rotation. The motor movement is controlled by the video controller such that it causes the carriage to move the anamorphic optics to one of two positions. In the first position the anamorphic optics are brought to a position out of the light path and in the second position, as shown in FIG. 6, the anamorphic optics are brought to a position in the light path and concentric to the projector lens.

While the belt operated movement of the carriage carrying the anamorphic lens illustrates one embodiment of how the anamorphic optics can be moved in and out of the light path, there are many other alternative methods that can be chosen. By way of example, the carriage could be driven along the rodslide rails by the motor directly without the use of the belt. In other embodiments where the anamorphic optics is not mounted to the carriage but instead is hinged to flip up or down ninety degrees from the light path, the motor can operate a gear mechanism which causes the anamorphic optics to move to and from its positions in and out of the light path. Alternatively, in this hinged embodiment, the motor can operate the movement of the anamorphic optics directly without the need for a gear mechanism.

Therefore as shown, the method of motorizing the anamorphic optics to move it into and out of the light path can be varied, and there are a range of options which can be used to accomplish the same result. Each of the options may work equally well and has cost and complexity factors which are left to the discretion of the manufacturer. Each of the alternative methods for controlling the movement of the anamorphic lens can be in part dictated by the physical and mechanical characteristics of the particular DLP model projector to which it is being fitted.

While the above description provides a full and complete disclosure of the preferred embodiment of this invention, various modifications, alternate constructions and equivalents may be employed without departing from the true spirit and scope of the invention to accommodate a greater variety of models of video projectors. Such changes might involve, as illustrated, alternate components, structural arrangements, or the application of the invention to video projectors other a specific model type described herein.

Those of ordinary skill in the art will appreciate that the alternative motors may be used to facilitate the movement of the anamorphic optics. Equally the rodslide rails can be substituted by a variety of other mechanical systems, some of which have been described, which are capable of moving the anamorphic lens into position in the light path and completely out of the light path as desired. Further the communications signal between the motorized carriage and the video controller could be easily accomplished with other analog signals besides 12V or even with a digital signal if desired.

The remote control device used to select the video source which signals the video controller can be of the wireless type or could equally be one which is wired to the video controller.

Therefore the above description and accompanying illustrations should not be construed as limiting the scope of the invention which is defined by the appended claims. Rather the scope of the invention is aforementioned description, the appended claims and their equivalents thereof.

What is claimed is:

1. A video display system, comprising:
   a video projector including a spatial light modulator for generating images to be projected;
   a remote control;
   a video controller;
   a memory;
   a motorized anamorphic lens;
   said video controller responding to a signal from said remote control to access data stored in the memory to determine whether to position said anamorphic lens in or out of a light path of the video projector and determine whether to stretch said images vertically to fill the spatial light modulator, said signal indicative of a specific aspect ratio of said images; and
   in response to the signal from said remote control and based on data accessed in the memory, said video controller automatically adjusting settings on said video projector appropriate for displaying images associated with said specific aspect ratio; and
   in response to the signal from said remote control and based on data accessed in the memory, said video controller selecting a position for said anamorphic lens appropriate for displaying images of constant vertical height regardless of the specific aspect ratio chosen.

2. The video display system in accordance with claim 1, wherein said anamorphic lens is automatically placed in the light path of said video projector and located in front of and concentric to said video projector lens for one aspect ratio and moved out of the light path for at least one other aspect ratio.

3. The video system in accordance with claim 1, wherein said remote control can be connected to said video controller by wireless or wired signaling.

4. The video display system in accordance with claim 1, further comprising:
   a reflective screen, wherein the anamorphic lens is interposed between the video projector and the reflective screen when placed in the light path of the video projector so that light is reflected off of the reflective screen.

5. The video display system in accordance with claim 1, further comprising:
   two elongate rails supported on a housing of the video projector, the two rails separated by a distance and positioned parallel to each other and perpendicular to the light path of the video projector;
   a carriage slidably supported by the two rails for movement along the longitudinal extent of the rails, the carriage configured to support the anamorphic lens;
   a belt coupled to the carriage and extending between two pulleys, the pulleys supported by the housing of the video projector proximate opposing ends of one of the rails and positioned such that the belt extends along the longitudinal extent of the rails; and
   a motor coupled to one of the pulleys and configured to rotate the pulley to thereby slide the carriage and the anamorphic lens along the longitudinal extent of the rails.

6. The video display system in accordance with claim 1, wherein the video controller is housed within the video projector.

7. The video display system in accordance with claim 1, wherein the setting automatically adjusted by said video controller comprises a resolution of the projector.

8. The video display system in accordance with claim 1, wherein the specific aspect ratio comprises a 2.35:1 aspect ratio.

9. A video display system, comprising:
   a video projector having an image generating device, a memory, and a video controller housed within the video projector, the image generating device defining a native aspect ratio of the video projector;
   an anamorphic lens externally mounted to the video projector for movement between a first position wherein the anamorphic lens is in a light path of the video projector and a second position wherein the anamorphic lens is out of the light path of the video projector;
   a motor configured to move the anamorphic lens between the first and second positions in response to an indication from the video controller; and
   a remote control for transmitting a signal to the video projector indicative of an aspect ratio of an image to be displayed,
   wherein, in response to the signal from the remote control, the video controller is configured to:
       access data stored in the memory of the video projector to determine whether to position the anamorphic lens in or out of the light path of the video projector and determine whether to stretch the image vertically;

if the indicated aspect ratio of the image extends further in a horizontal direction than the native aspect ratio of the video projector, stretch the image vertically such that the image fills the image generating device in both the vertical and horizontal directions and move the anamorphic lens to the first position so that the anamorphic lens optically stretches the image in the horizontal direction thereby restoring the aspect ratio of the image to the indicated aspect ratio; and if the indicated aspect ratio of the image is less than or equal to the native aspect ratio of the video projector in the horizontal direction, move the anamorphic lens to the second position.

10. The video display system in accordance with claim 9, further comprising:

a reflective screen, wherein the video projector and the reflective screen are configured such that the video projector projects light toward the reflective screen.

11. The video display system in accordance with claim 9, wherein the native aspect ratio of the video projector comprises a 16:9 aspect ratio.

12. The video display system in accordance with claim 11, wherein the image is stretched vertically and the anamorphic lens is moved to the first position if the indicated aspect ratio of the image comprises a 2.35:1 aspect ratio.

13. The video display system in accordance with claim 11, wherein the anamorphic lens is moved to the second position if the indicated aspect ratio of the image comprises a 4:3 or 16:9 aspect ratio.

14. A method of displaying an image with a video projector having an image generating device defining a native aspect ratio of the video projector, the method comprising:

receiving a signal from a remote control indicative of an aspect ratio of an image to be displayed;

in response to the signal received from the remote control, accessing data stored in a memory of the video projector to determine whether to position an anamorphic lens in or out of a light path of the video projector and determine whether to stretch the image vertically;

if the indicated aspect ratio of the image extends further in a horizontal direction than the native aspect ratio of the video projector, stretching the image vertically such that the image fills the image generating device in both the vertical and horizontal directions and positioning the anamorphic lens in the light path of the video projector such that the anamorphic lens optically stretches the image in the horizontal direction thereby restoring the aspect ratio of the image to the indicated aspect ratio; and if the indicated aspect ratio of the image is less than or equal to the native aspect ratio of the video projector in the horizontal direction, positioning the anamorphic lens out of the light path of the video projector.

15. The method in accordance with claim 14, further comprising:

providing a reflective screen to reflect light from the video projector.

16. The method in accordance with claim 14, wherein the native aspect ratio of the video projector comprises a 16:9 aspect ratio.

17. The method in accordance with claim 16, wherein the image is stretched vertically and the anamorphic lens is positioned in the light path of the video projector if the indicated aspect ratio of the image comprises a 2.35:1 aspect ratio.

18. The method in accordance with claim 16, wherein the anamorphic lens is positioned out of the light path of the video projector if the indicated aspect ratio of the image comprises a 4:3 or 16:9 aspect ratio.

19. The method in accordance with claim 14, further comprising:

mounting the anamorphic lens to an exterior portion of the video projector for movement in and out of the light path of the video projector.

20. The video system in accordance with claim 1, wherein the spatial light modulator comprises a digital micromirror device.

21. The video display system in accordance with claim 9, wherein the image generating device comprises a spatial light modulator.

22. The video display system in accordance with claim 9, wherein the image generating device comprises a digital micromirror device.

23. The method in accordance with claim 14, wherein the image generating device comprises a spatial light modulator.

24. The method in accordance with claim 14, wherein the image generating device comprises a digital micromirror device.

25. The video display system in accordance with claim 9, further comprising:

two elongate rails supported on a housing of the video projector, the two rails separated by a distance and positioned parallel to each other and perpendicular to the light path of the video projector;

a carriage slidably supported by the two rails for movement along the longitudinal extent of the rails, the carriage configured to support the anamorphic lens; and a belt coupled to the carriage and extending between two pulleys, the pulleys supported by the housing of the video projector proximate opposing ends of one of the rails and positioned such that the belt extends along the longitudinal extent of the rails, wherein the motor is coupled to one of the pulleys and configured to rotate the pulley to thereby slide the carriage and the anamorphic lens along the longitudinal extent of the rails.

* * * * *

UNITED STATES PATENT AND TRADEMARK OFFICE
CERTIFICATE OF CORRECTION

PATENT NO.       : 7,654,678 B1                                      Page 1 of 1
APPLICATION NO. : 11/307736
DATED            : February 2, 2010
INVENTOR(S)      : Runco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Twenty-third Day of November, 2010

David J. Kappos
*Director of the United States Patent and Trademark Office*